US008279940B2

(12) United States Patent
Haskell et al.

(10) Patent No.: US 8,279,940 B2
(45) Date of Patent: Oct. 2, 2012

(54) SYSTEM, METHOD AND COMPUTER-READABLE MEDIUM FOR ENCODING A SIGNAL INTO MACROBLOCKS

(75) Inventors: Barin Geoffry Haskell, Tinton Falls, NJ (US); Atul Puri, Riverdale, NY (US); Robert Lewis Schmidt, Howell, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 119 days.

(21) Appl. No.: 12/776,106

(22) Filed: May 7, 2010

(65) Prior Publication Data

US 2010/0215097 A1  Aug. 26, 2010

Related U.S. Application Data

(63) Continuation of application No. 11/170,622, filed on Jun. 29, 2005, now Pat. No. 7,738,555, which is a continuation of application No. 10/664,985, filed on Sep. 18, 2003, now Pat. No. 7,269,219, which is a continuation of application No. 09/974,788, filed on Oct. 12, 2001, now Pat. No. 6,654,418, which is a continuation of application No. 08/899,096, filed on Jul. 24, 1997, now Pat. No. 6,347,116.

(60) Provisional application No. 60/038,016, filed on Feb. 14, 1997.

(51) Int. Cl.
 *H04N 7/18* (2006.01)

(52) U.S. Cl. ......... 375/240.25; 375/240.03; 375/240.04

(58) Field of Classification Search . 375/240.01–240.29
See application file for complete search history.

(56) References Cited

U.S. PATENT DOCUMENTS

| 4,920,414 | A |   | 4/1990  | Remus et al.     |
|-----------|---|---|---------|------------------|
| 5,170,264 | A |   | 12/1992 | Saito et al.     |
| 5,294,974 | A |   | 3/1994  | Naimpally et al. |
| 5,426,512 | A |   | 6/1995  | Watson           |
| 5,434,623 | A |   | 7/1995  | Coleman          |
| 5,473,377 | A |   | 12/1995 | Kim              |
| 5,493,513 | A |   | 2/1996  | Keith et al.     |
| 5,511,003 | A | * | 4/1996  | Agarwal ................. 709/204 |
| 5,524,024 | A |   | 6/1996  | Lin              |
| 5,543,844 | A |   | 8/1996  | Mita et al.      |

(Continued)

FOREIGN PATENT DOCUMENTS

EP  0 400 756  12/1990

(Continued)

OTHER PUBLICATIONS

Puri et al. "Description and Results of Coding Efficiency Modified Experiment T16 in MPEG-4 Video", International Organization for Standardization, ISO/IEC JTC1/SC29/WG11, MPEG97/1703, Feb. 1997, Sevilla.

(Continued)

*Primary Examiner* — Andy Rao

(57) ABSTRACT

A quantizer and dequantizer for use in a video coding system that applies non linear, piece-wise linear scaling functions to video information signals based on a value of a variable quantization parameter. The quantizer and dequantizer apply different non linear, piece-wise linear scaling functions to a DC luminance signal, a DC chrominance signal and an AC chrominance signal. A code for reporting updates of the value of the quantization parameter is interpreted to require larger changes when the quantization parameter initially is large and smaller changes when the quantization parameter initially is small.

22 Claims, 2 Drawing Sheets

U.S. PATENT DOCUMENTS

| | | |
|---|---|---|
| 5,559,557 A | 9/1996 | Kato |
| 5,565,921 A | 10/1996 | Sasaki et al. |
| 5,570,203 A | 10/1996 | Suzuki et al. |
| 5,604,540 A | 2/1997 | Howe |
| 5,612,900 A | 3/1997 | Azadegan et al. |
| 5,659,362 A | 8/1997 | Kovac et al. |
| 5,731,837 A | 3/1998 | Hurst, Jr. |
| 5,822,005 A | 10/1998 | Horne |
| 5,822,462 A | 10/1998 | Miyake |
| 5,835,149 A | 11/1998 | Astle |
| 5,870,144 A | 2/1999 | Guerrera |
| 5,929,916 A | 7/1999 | Legall et al. |
| 5,937,098 A | 8/1999 | Abe |
| 5,974,184 A | 10/1999 | Eifrig et al. |
| 6,219,043 B1 | 4/2001 | Yogeshwar et al. |
| 6,219,457 B1 | 4/2001 | Potu |
| 2004/0028143 A1 | 2/2004 | Schoenblum |

FOREIGN PATENT DOCUMENTS

| | | |
|---|---|---|
| EP | 0 540 961 | 10/1992 |
| EP | 0 514 663 | 11/1992 |
| EP | 0 517 256 | 12/1992 |
| EP | 0 566 219 | 10/1993 |
| EP | 0 582 819 | 2/1994 |
| EP | 0699003 | 2/1996 |
| EP | 1073276 | 1/2001 |
| EP | 1944976 | 7/2008 |

OTHER PUBLICATIONS

"Quantizing Characteristics Based on Initial Compatibility Check Parameters," CCITT SG XV, Doc. 285, Specialist Group on Coding for Visual Telephony, Jan. 1988.

"Modified signaling of changed quantizer stepsize," International Organization for Standardization: Coded Representation of Picture and Audio Information; ISO-IEC/JTC1/SG2/WG8, MPEG 90-126, Jul. 1990.

"Report of the Sixteenth Meeting in Stuttgart," Specialists Group on Coding for Visual Telephony, CCITT SGXV, Working Party XV/1, 89-540, Jun. 16, 1989.

"Framework for improving Quantization Options," International Organization for Standarizaton: Coded Representation of Picture and Audio Information, ISO-IEC/JTC1/SC29/WG11, MPEG 92-357, Angra dos Reis, Jul. 1992.

"Recommendations resuiting from ad-hoc group meeting," International Organization for Standardization: Coded Representation of Picture and Audio Information, ISO-IEC/JTC1/SC29/WG11, MPEG 92-542, Sep. 1992.

Screen capture of MPEG Documents Repository for Sevilla Meeting of Feb. 1997.

Schirling, Peter "Guidelines For Electronic Distribution of MPEG and WG11 Documents", ISO/IEC JTC1/SC29/WG11 N1416, Nov. 1996, pp. 1-4.

Ad hoc group on MPEG-4 video VM editing, "MPEG-4 Video Verification Model Version 7.0", ISO/IEC JTC1/SC29/WG11 MPEG97/N1642, Bristol, Apr. 1, 1997, pp. 1-271.

Shirling, Pete, "Sevilla Document Register", ISO/IEC JTC1/SC29/WG11, MPEG97/1596, Feb. 13, 1997.

Sevilla Contributions as of Feb. 21, 1997—11:17 GMT, ISO/IEC JTC 1/SC 29/WG 11, MPEG.

Chiariglione, Leonardo et al., The MPEG-4 Book, Foreword; Preface: Chapter 1 (Context, Objectives, and Process), Jan. 1, 2002, The MPEG-4 Book, Prentice Hall, Upper Saddle River, NJ, pp. XIV-XXI, XXIII, XP001562221, ISBN: 978-0-13-061621-0.

Kim, et al., "Region-based shape descriptor invariant to rotation, scale, and translation", Signal Processing: Image Communication, Elsevier Science Publishers, Amsterdam, NL, vol. 16, No. 1-2, Sep. 1, 2000, pp. 87-93, XP004216269.

* cited by examiner

SYSTEM, METHOD AND COMPUTER-READABLE MEDIUM FOR ENCODING A SIGNAL INTO MACROBLOCKS

RELATED APPLICATIONS

This application is a continuation of U.S. patent application Ser. No. 11/170,622, filed Jun. 29, 2005 and issued as U.S. Pat. No 7,738,555, which is a continuation of application Ser. No. 10/664,985, filed Sep. 18, 2003, and issued as U.S. Pat. No. 7,269,219, which is a continuation of application Ser. No. 09/974,788, filed on Oct. 12, 2001 and issued as U.S. Pat. No. 6,654,418, which is a continuation of application Ser. No. 08/899,096, filed on Jul. 24, 1997 and issued as U.S. Pat. No. 6,347,116, which claims the benefit of priority afforded by provisional application no. 60/038,016, filed Feb. 14, 1997, the disclosure of each of these applications is incorporated herein by reference.

BACKGROUND OF THE INVENTION

1. Field of the Invention

The present invention related to a quantizer for use in image coding. It is known to scale discrete cosine transformation coefficients in video coding applications to conserve bandwidth.

2. Introduction

Known systems either scale by a small constant, such as divide by 8, or scale by a linear scaling factor that is twice a quantization parameter ($2 \times Q_p$). Scaling by the small constant does not achieve significant bandwidth savings. Scaling by the $2*Q_p$ linear scaling function achieves significant bit savings, but results in poor image quality at lower and mid-level $Q_p$ values particularly in the chrominance video signals. Accordingly, there is a need in the art. for a quantizer characterized by a scaling function that achieves good signal quality, and achieves bit rate savings for all values of $Q_p$ particularly for chrominance.

An encoder and decoder must use the same quantization parameter to encode and decode video information intelligibly. Known systems report changes to the quantization parameter with codes that cause changes in $Q_p$ with a uniform step size, regardless of the value of $Q_p$. Experience teaches that, at low values of $Q_p$, changes in $Q_p$ are relatively small. However, for large values of $Q_p$, changes in $Q_p$ values are relatively large. Systems that allocate additional bits to report the larger $Q_p$ changes waste bandwidth at the lower $Q_p$ values where the large changes do not occur. However, systems that limit the number of bits available to coding $Q_p$ changes may become saturated if larger changes must be coded. Accordingly, there is a need in the art for a quantizer that reports both large and small changes in $Q_p$ with a minimum number of bits.

SUMMARY

The disadvantages of the art are alleviated to a great extent by a quantizer that applies a non-linear scaling function based on the quantization parameter. A different scaling function applies for luminance data than chrominance data. Both scaling functions at low $Q_p$ values approximate constant scaling functions. At large $Q_p$ values, the luminance scaling function approximates a $2*Q_p$ scaling function and the chrominance scaling function approximates a $1*Q_p$ scaling function. The quantizer may include a non-linear scaling function for AC coefficients. The present invention may include a way to update values of $Q_p$. Changes in $Q_p$ are reported in a fixed length code, but each code means different things based on the previous values of $Q_p$. If the previous $Q_p$ value is large, the code represents a larger change than if the previous value of $Q_p$ were small.

DETAILED DESCRIPTION

Figure 1A:
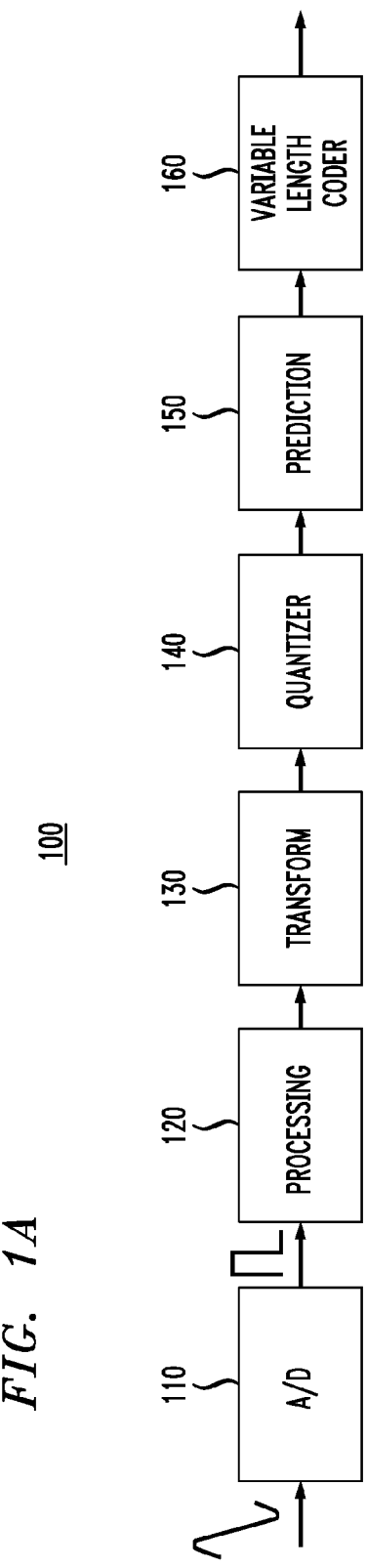
FIG. 1(a) is a block diagram of a first embodiment of an encoder 100 of the present invention.
Figure 1B:
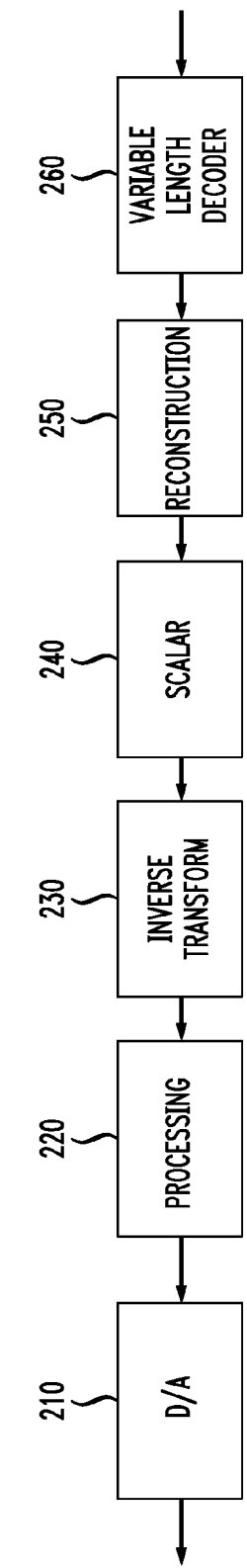
FIG. 1(b) is a block diagram of a first embodiment of a decoder 200 of the present invention.

FIG. 1 shows an encoder 100 constructed in accordance with a first embodiment of the present invention. The encoder 100 can include a processor and a computer-readable storage medium storing instructions that, when executed by the processor, perform the encoding steps disclosed herein. An analog image signal is presented to the encoder 100. The image signal is sampled and converted to a digital signal by an analog to digital ("A/D") converter 110 using techniques known in the art. The A/D converter 110 generates a digital image signal for a plurality of pixels of the image. Alternatively, the image signal may be presented to the encoder 100 as a digital image signal; in this case, the A/D converter 110 is omitted.

The digital image signal is input to a processing circuit 120. The processing circuit 120 may perform a host of functions. Typically, the processing circuit 120 filters the image data and breaks the image data into a luminance signal component and two chrominance signal components. Additionally, the processing circuit 120 groups image data into blocks of data. Where the digital input signal represents information for a plurality of pixels in a scanning direction, the digital output of the processing circuit 120 represents a block of pixels, for example an 8 pixel by 8 pixel array of image data. The processing circuit 120 outputs image data on a macro block basis. A macro block typically consists of blocks of luminance data and blocks of chrominance data, for example, up to four blocks of luminance data and up to two blocks of chrominance data. The processing circuit 120 may also perform additional functions, such as filtering, to suit individual design criteria. The output of the processing circuit 120 is input to a transform circuit 130. The transform circuit 130 performs a transformation of the image data, such as discrete cosine transform ("DCT") coding, from the pixel domain to a domain of coefficients. A block of 64 pixels is transformed to a block of 64 coefficients. Coefficients output by DCT coding include a single DC coefficient and 63 AC coefficients, few of which are nonzero. The transform circuit 130 outputs blocks of coefficients organized into macro blocks.

A quantizer 140 scales the DC and AC coefficients generated by the prediction circuit 150 according to a non-linear scaling function governed by a variable quantization parameter $Q_p$. The quantization parameter is a value determined by the bit rate of the channel, the resolution of the image being coded, the type of image coding (intra or inter) and other factors that affect a number of bits that may be allocated to coding of the macro block. $Q_p$ is updated on a macro block by macro block basis; changes in $Q_p$ are reported in an output bitstream. In MPEG coding, $Q_p$ takes on values between 1 and 31. The quantizer 140 reduces bandwidth of the image signal by reducing a number of quantization levels available to encoding the signals. Many small coefficients input to the quantizer 140 are divided down and truncated to zero. The scaled signals are output from the quantizer 140.

The output of the quantizer 140 is input to a prediction circuit 150. The prediction circuit 150 performs gradient prediction analysis to predict the DC coefficient of the block. The prediction circuit 150 may pass the AC coefficients generated by the transform circuit 130 or, alternatively, may predict AC coefficients of the block. In a preferred mode of operation, the prediction circuit 150 selects between modes of predicting or passing AC coefficients; in this case, the prediction circuit 150 generates an AC prediction flag to identify a mode of operation. The prediction circuit 150 outputs DC coefficient signals and AC coefficient signals (representing either AC coefficients or AC residuals) on a macro block basis and, on a macro block basis optionally, an AC prediction flag. A variable length coder 160 encodes the output of the quantizer 140. The variable length coder 160 typically is a Huffman encoder that performs run length coding on the scaled signals. A bitstream output from the variable length coder 160 may be transmitted, stored, or put to other uses as are known in the art. A decoder 200 performs operations that undo the encoding operation described above. The decoder 200 can include a processor and a computer-readable storage medium storing instructions that, when executed by the processor, perform the decoding steps disclosed herein. A variable length decoder 260 analyzes the bitstream using a complementary process to recover a scaled signal. If a Huffman encoder were used by the encoder 160, a Huffman decoder 260 is used. A reconstruction circuit 250 performs the identical gradient analysis performed in the prediction circuit 150. The DC residual signal is identified and added to a predicted coefficient to obtain a DC coefficient. Optionally, the reconstruction circuit 250 may identify the AC prediction flag and, based on the status of that flag, interprets the AC information as either AC coefficient information or AC residual information. In the event that AC residual information is present, the reconstruction circuit 250 adds the residual signals to corresponding predicted signals to obtain AC coefficients. The reconstruction circuit 250 outputs coefficient signals.

A dequantization circuit 240 multiplies the recovered signals by the same scaler values used at the quantizer 140. Of course, those coefficients divided down to zero are not recovered.

An inverse transformation circuit 230 performs the inverse transformation applied by the transform circuit 130 of encoder 100. If DCT transformation were performed, an inverse DCT transformation is applied. So, too, with sub-band coding. The inverse transformation circuit 230 transforms the coefficient information back to the pixel domain.

A processing circuit 220 combines luminance and chrominance signals and may perform such optional features as are desired in particular application. The processing circuit 220 outputs digital signals of pixels ready to be displayed. At this point the signals are fit for display on a digital monitor. If necessary to fit a particular application, the signals may be converted by a digital to analog converter 210 for display on an analog display.

The present invention achieves bit rate savings by applying a non-linear scaler function at the quantizer 140 to obtain bit rate savings at high $Q_p$ levels but ensure high video quality at low $Q_p$ levels. The quantizer 140 applies different scaler functions depending upon the type of data being quantized (luminance or chrominance), the type of coefficient being quantized (DC or AC) and the type of coding (inter or intra) being performed.

Non-Linear Quantization of DC Coefficients for Luminance and Chrominance

For DC coefficient information, the scaler functions vary with $Q_p$. Different piece-wise linear scaler functions are applied to DC luminance and DC chrominance signals. To minimize objectionable artifacts within the chrominance signal, the DC chrominance scaler is smaller than the DC luminance scaler for all $Q_p$ values.

The DC luminance scaler function for low $Q_p$ values is a constant. For large $Q_p$ levels, the DC luminance scaler function approximates a $2*Q_p$ function. The inventors obtained through experimentation the DC scaler function shown in Table 1 below, used in an embodiment of the invention.

The DC chrominance scaler function is also at a constant at low values $Q_p$. At high $Q_p$ values, the DC chrominance scaler function approximates a linear scaler function in $Q_p$. The inventors obtained through experimentation the DC scaler function for chrominance signals shown in Table 1 below, used in a preferred embodiment.

TABLE 1

| Component | DC Scaler for Quantizer ($Q_p$) Range | | | |
|---|---|---|---|---|
| | 1 through 4 | 5 through 8 | 9 through 24 | 25 through 31 |
| Luminance | 8 | $2 * Q_p$ | $Q_p + 8$ | $2 * Q_p - 16$ |
| Chrominance | 8 | $(Q_p + 13)/2$ | $(Q_p - 13)/2$ | $Q_p - 6$ |

Rather than compute the DC scaler for each value of $Q_p$, further efficiencies may be obtained by storing the DC scaler functions for luminance and chrominance for all values of $Q_p$ in a memory table at the quantizer 140. In this event, the quantizer 140 includes a small memory of DC scales for luminance and chrominance that may be indexed by $Q_p$ as shown in Table 2 below.

| $Q_p$ | DC Scaler for Luminance | DC Scaler for Chrominance |
|---|---|---|
| 1 | 8 | 8 |
| 2 | 8 | 8 |
| 3 | 8 | 8 |
| 4 | 8 | 8 |
| 5 | 10 | 9 |
| 6 | 12 | 9 |
| 7 | 14 | 10 |
| 8 | 16 | 10 |
| 9 | 17 | 11 |
| 10 | 18 | 11 |
| 11 | 19 | 12 |
| 12 | 20 | 12 |
| 13 | 21 | 13 |
| 14 | 22 | 13 |
| 15 | 23 | 14 |
| 16 | 24 | 14 |
| 17 | 25 | 15 |
| 18 | 26 | 15 |
| 19 | 27 | 16 |
| 20 | 28 | 16 |
| 21 | 29 | 17 |
| 22 | 30 | 17 |
| 23 | 31 | 18 |
| 24 | 32 | 18 |
| 25 | 34 | 19 |
| 26 | 36 | 20 |
| 27 | 38 | 21 |
| 28 | 40 | 22 |
| 29 | 42 | 23 |
| 30 | 44 | 24 |
| 31 | 46 | 25 |

In operation, the transform circuit 130 outputs macro data to the quantizer 140. Each macro block contains zero or more blocks of luminance data and zero or more blocks of chrominance data. For example, each macro block may contain as many as four blocks of luminance data and two blocks of chrominance data. A single $Q_p$ value is used for the macro block. $Q_p$ is updated on a macro block by macro block basis.

Based on the value of $Q_p$, the quantizer 140 recalls a DC scaling factor for luminance and a DC scaling factor for chrominance determined by the scaling functions at the value of $Q_p$. For each luminance block, the quantizer 140 generates a DC lum level signal according to:

DC lum level=DC lum coefficient/DC Scaler for Luminance.

For each chrominance block, the quantizer 140 generates a DC chrom level signal according to:

Chrom DC level=Chrom DC coefficient/DC Scaler for Chrominance.

The quantizer 140 outputs each DC lum level signal and each DC chrom level signal.

Figure 2:
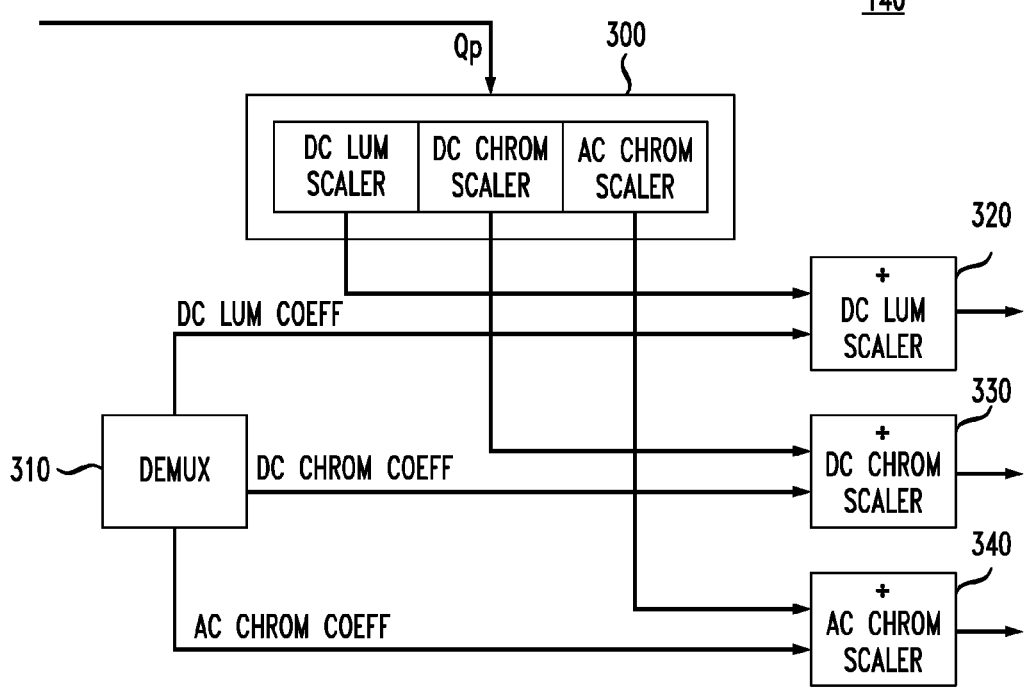
FIG. 2 is a block diagram of a portion of the quantizer of FIG. 1.

The non-linear DC scaling functions of the quantizer 140 may be implemented in hardware as shown in FIG. 2. The $Q_p$ signal is input to a memory 300 that stores the scaler factors defined by the DC luminance and DC chrominance scaler functions. The scaler table 300 may be substituted by a processor (not shown) that computes the scaler factors according to the $Q_p$ value. DC luminance and DC chrominance signals from the transform circuit 130 are isolated by a demultiplexer 310 and routed to respective luminance and chrominance division circuits 320 and 330. The DC lum level and DC chrom level signals are generated by these division circuits.

At the decoder 200, the dequantization circuit 240 performs an inverse quantization operation with the same piecewise linear scaling functions. Based on the $Q_p$ value of the immediately preceding macro block and any $Q_p$ update reported in the incoming bitstream, the dequantization circuit 240 recalls appropriate scaling factors for DC luminance and DC chrominance signals. For each luminance block, the dequantization circuit 240 generates a luminance DC coefficient according to:

Lum DC coefficient=DC Lum Level*DC Scaler for Luminance.

For each chrominance block, the scaling circuit 240 generates a DC coefficient according to:

Chrom DC coefficient=Chrom DC Level*DC Scaler for Chrominance.

The dequantization circuit 240 outputs the reconstructed luminance and chrominance coefficients.

Figure 3:
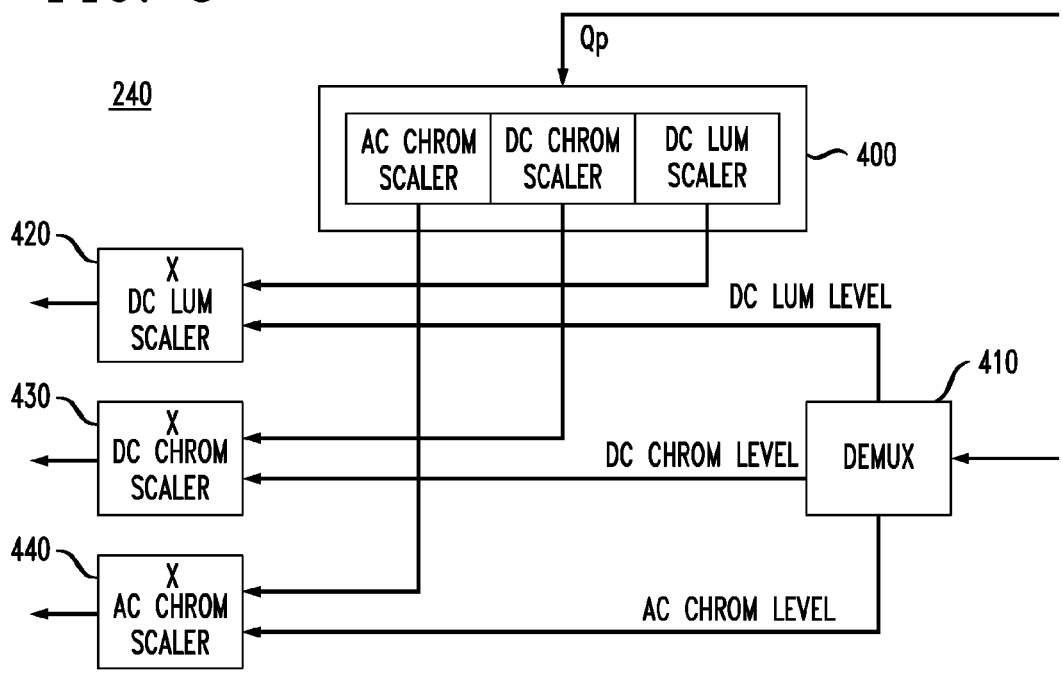
FIG. 3 is a block diagram of a portion of the scaling circuit of FIG. 1.

The non-linear DC scaling functions of the dequantization circuit 240 may be implemented in hardware as shown in FIG. 3. The $Q_p$ signal is input to a memory 400 that stores the scaler factors defined by the DC luminance and DC chrominance scaler functions. The scaler table 400 may be substituted by a processor (not shown) that computes the scaler factors according to the $Q_p$ signal. DC lum level and DC chrom level signals from the variable length encoder 260 are isolated by a demultiplexer 410 and routed to respective luminance and chrominance multiplication circuits 420 and 430. DC luminance coefficients and DC chrominance coefficients are generated by these multiplication circuits.

The non-linear DC scaling factors described above are appropriate to both intra and inter coding operations. However, experience teaches that DC coefficients obtained from inter coding often are near zero. When quantized even by a constant scaling factor, the DC coefficients obtained from inter coding often are truncated to zero. Accordingly, to reduce complexity in a preferred embodiment, the non-linear scaling function may be disabled during inter coding operations. The DC coefficients obtained from inter coding may be quantized in a manner similar to the quantization of AC coefficients, discussed below.

The non-linear DC scaling functions maintain high coding quality at low $Q_p$ values and achieve significant bit rate savings at high $Q_p$ values. The quantizer 140 and dequantization circuit 240 of the present invention may find use in applications where image quality is a more significant consideration than bit rate savings. Accordingly, in a preferred embodiment, the quantizer 140 and scaler circuit 240 may have two modes of operation: A first mode applying non-linear scaling functions based on values of $Q_p$ as described above, and a second mode applying a constant scaling factor (such as divide by 8) or even one of a plurality of constant scaling factors (such as divide by 8, 4, 2 or 1). In this embodiment, the quantizer 140 generates a scaler flag signal identifying which mode of operation is being used. The dequantization circuit 240, upon receipt of the scaler flag signal, invokes an appropriate mode of operation to generate coefficients. The scaler flag signal may be a one bit signal when discriminating among the two modes, but may be larger when discriminating among the two modes and additionally identifying which of constant scaling factors is invoked.

Non-Linear Quantization Of Chrominance Coefficients For Inter Coded Blocks

In inter coding, both DC and AC coefficients of chrominance blocks may be close to zero. Coding of such coefficients with non-linear scaling functions may improve coding quality of the chrominance signal. Additionally, the non-linear scaling functions of this section may be applied to AC coefficients of chrominance blocks in intra coding to achieve coding efficiencies.

The non-linear scaling function for AC chrominance coefficients is piece-wise linear and based on $Q_p$ values. At low values for $Q_p$, the non-linear scaling function for AC is a constant value, almost half of the level of the scaling function for DC chrominance signals. At high levels for $Q_p$, the AC scaling function approximates a $Q_p/2$ line. At intermediate levels, the AC scaling function approximates a $Q_p/4$ line. In one preferred embodiment, the AC scaling function for chrominance was derived experimentally as shown in Table 3 below:

TABLE 3

| | Quantizer for Chrominance when $Q_p$ in Range | | | |
|---|---|---|---|---|
| Component | 1 through 4 | 5 through 8 | 9 through 24 | 25 through 31 |
| Chrominance | 4 | $(Q_p + 13)/4$ | $(Q_p + 13)/4$ | $(Q_p - 6)/2$ |

The AC scaling factors for chrominance also may be stored in the quantizer 140 in a memory table indexed by $Q_p$.

During coding, the quantizer 140 recalls or computes a scaling factor for AC coefficients based on the value of $Q_p$. For each chrominance AC coefficient, the quantizer 140 generates a corresponding chrominance AC level signal according to:

Chrom AC level=Chrom AC coefficient/Quantizer for Chrominance.

The quantizer 140 outputs the Chrom AC level signals for the AC coefficients.

The non-linear scaling functions for AC chrominance coefficients may be implemented in hardware, also shown in FIG. 2. The scaler table 300 stores the AC chrominance scaler values indexed by $Q_p$. If scaler table 300 is substituted by a processor, the processor computes the AC chrominance scaler values according to the $Q_p$ value. AC chrominance signals from the transform circuit 140 are isolated by a demultiplexer 310 and routed to an AC division circuit 340. The AC chrom level signals are generated by the division circuit 340.

During decoding, the dequantization circuit 240 recalls the AC scaling factor for chrominance based on the value of $Q_p$ used for the immediately previous macro block and any $Q_p$ update provided in the incoming bitstream. For each AC chrominance level signal, the scaling circuit 240 reconstructs a corresponding AC chrominance coefficient according to:

Chrom AC coefficient=Chrom AC Level*Quantizer for Chrominance.

The scaling circuit 240 outputs the reconstructed chrominance AC coefficients.

The scaling circuit's non-linear AC scaling functions may be implemented in hardware, also shown in FIG. 3. The scaler table 400 stores the AC chrominance scaler values indexed by $Q_p$. If scaler table 400 is substituted by a processor, the processor computes the AC scaler value according to the $Q_p$ signal. AC chrom level signals from the variable length encoder 160 are isolated by a demultiplexer 410 and routed to an AC multiplication circuit 440. The AC coefficients are generated by the multiplication circuit 440.

Quantizer Update

The encoder 100 and decoder 200 each must use the same $Q_p$ value for video signals to be encoded and decoded intelligibly. The encoder 100 may change a value of $Q_p$ as frequently as every macro block. When the encoder 100 changes $Q_p$, it reports the change in a $Q_p$ update signal in the output bitstream.

The present invention provides for an improved method of reporting updated $Q_p$ values to the decoder 200. For each $Q_p$ update, the magnitude of the $Q_p$ adjustment depends not only on the update signal but also the previous value of $Q_p$. A given $Q_p$ update signal at a large value of $Q_p$ results in a relatively large change in $Q_p$. The same $Q_p$ update signal at a small value of $Q_p$ results in a smaller change in $Q_p$. The following Table 4 demonstrates $Q_p$ adjustments made based on the $Q_p$ update signal and the value of $Q_p$ in one preferred embodiment of the invention.

TABLE 4

| DQuant Code | $Q_p$ Change Based on $Q_p$ Value | | | |
| --- | --- | --- | --- | --- |
| | 1 through 6 | 7 through 13 | 14 through 21 | 22 through 31 |
| 00 | −1 | −1 | −2 | −3 |
| 01 | −2 | −3 | −4 | −5 |
| 10 | 1 | 1 | 2 | 3 |
| 11 | 2 | 3 | 4 | 5 |

Providing variable step sizes for $Q_p$ updates based on the value of $Q_p$ provides resistance to saturation for large changes of $Q_p$ at the encoder 100. The variable step sizes provide increased flexibility without requiring additional overhead because the previous value of $Q_p$ is known at the 25 decoder 200 and need not be reported in the bitstream.

We claim:

1. A decoder comprising:
a processor; and
a non-transitory computer-readable storage medium storing instructions that, when executed by the processor, perform a method comprising:
determining a quantization parameter from quantization data in a bitstream;
generating a luminance scalar according to a piece-wise linear transformation of the quantization parameter, wherein:
(i) the luminance scalar equals 8 whenever the quantization parameter falls within the values 1 through 4, inclusive;
(ii) the luminance scalar equals 2 times the quantization parameter whenever the quantization parameter falls within the values 5 through 8, inclusive;
(iii) the luminance scalar equals the quantization parameter plus 8 whenever the quantization parameter falls within the values 9 through 24, inclusive; and
(iv) the luminance scalar equals 2 times the quantization parameter whenever the quantization parameter falls within the values 25 through 31, inclusive;
inverse quantizing a DC coefficient of a luminance block of up to four luminance blocks by the luminance scalar to yield an inverse quantized DC coefficient;
transforming data of the up to four luminance blocks, including the inverse quantized DC coefficient, according to an inverse discrete cosine transform; and
merging data of the up to four luminance blocks to generate image data.

2. The decoder of claim 1, wherein non-transitory computer-readable storage medium further stores instructions that, when executed by the processor, perform a method comprising:
generating a chrominance scalar; and
inverse quantizing a DC coefficient of a chrominance block of up to two chrominance blocks by the chrominance scalar.

3. The decoder of claim 1, wherein the quantization data represents a change from a quantization parameter associated with a previously-decoded macroblock.

4. The decoder of claim 1, wherein the non-transitory computer-readable storage medium further stores instructions that, when executed by the processor, perform a method comprising:
if no quantization data is included in the bitstream for a particular macroblock, applying a previous quantization parameter associated with a previously-decoded macroblock as the quantization parameter.

5. The decoder of claim 2, wherein the chrominance scalar is generated according to a second piece-wise linear transformation of the quantization parameter.

6. The decoder of claim 5, wherein the second piece-wise linear transformation of the quantization parameter is as follows:
a) the chrominance scalar equals 8 whenever the quantization parameter falls within the values 1 through 4, inclusive;
(b) the chrominance scalar equals (the quantization parameter+13) /2 whenever the quantization parameter falls within the values 5 through 24, inclusive; and
(c) the chrominance scalar equals the quantization parameter minus 6 whenever the quantization parameter falls within the values 25 through 31, inclusive.

7. A decoder comprising:
a processor; and
a non-transitory computer-readable storage medium storing instructions that, when executed by the processor, perform a method comprising:
determining a quantization parameter from the quantization data in a bitstream;
generating a chrominance scalar according to a piece-wise linear transformation of the quantization parameter, wherein:
(a) the chrominance scalar equals 8 whenever the quantization parameter falls within the values 1 through 4, inclusive;
(b) the chrominance scalar equals (the quantization parameter+13)/2 whenever the quantization parameter falls within the values 5 through 24, inclusive; and (c) the chrominance scalar equals the quantization parameter minus 6 whenever the quantization parameter falls within the values 25 through 31, inclusive;

inverse quantizing a DC coefficient of a chrominance block of up to two chrominance blocks by the chrominance scalar to yield a an inverse quantized chrominance DC coefficient;

transforming data of the up to two chrominance blocks, including the inverse quantized chrominance DC coefficient, according to an inverse discrete cosine transform; and merging data of the up to two chrominance blocks to generate image data.

8. The decoder of claim 7, wherein the non-transitory computer-readable storage medium further stores instructions that, when executed by the processor, perform a method comprising:

generating a luminance scalar; and inverse quantizing a DC coefficient of a luminance block of up to four luminance blocks by the luminance scalar.

9. The decoder of claim 7, wherein the quantization data represents a change from a quantization parameter associated with a previously-decoded macroblock.

10. The decoder of claim 7, wherein the non-transitory computer-readable storage medium further stores instructions that, when executed by the processor, perform a method comprising:

if no quantization data is included in the bitstream for a particular macroblock, applying a previous quantization parameter associated with a previously-decoded macroblock as the quantization parameter.

11. The decoder of claim 8, wherein the luminance scalar is generated according to a second piece-wise linear transformation of the quantization parameter.

12. A method comprising:

(1) receiving quantization data in a bitstream;

(2) determining a quantization parameter from the quantization data;

(3) generating a luminance scalar according to a piece-wise linear transformation of the quantization parameter, wherein:

(i) the luminance scalar equals 8 whenever the quantization parameter falls within the values 1 through 4, inclusive;

(ii) the luminance scalar equals 2 times the quantization parameter whenever the quantization parameter falls within the values 5 through 8, inclusive;

(iii) the luminance scalar equals the quantization parameter plus 8 whenever the quantization parameter falls within the values 9 through 24, inclusive; and (iv) the luminance scalar equals 2 times the quantization parameter whenever the quantization parameter falls within the values 25 through 31, inclusive;

(4) inverse quantizing,. by the luminance scalar, a DC coefficient of a respective luminance block of up to four luminance blocks to yield an inverse quantized DC coefficient;

(5) transforming data of the up to four luminance blocks, including the inverse quantized DC coefficient, according to an inverse discrete cosine transform; and (6) merging data of the up to four luminance blocks to generate image data.

13. The method of claim 12, further comprising:

generating a chrominance scalar; and inverse quantizing a DC coefficient of a chrominance block of up to two chrominance blocks by the chrominance scalar.

14. The method of claim 12, wherein the quantization data represents a change from a quantization parameter for a previously-decoded macroblock.

15. The method of claim 12 wherein, if no quantization data is included in the bitstream for a particular macroblock, the method further comprises applying a previous quantization parameter associated with a previously-decoded macroblock as the quantization parameter.

16. The method of claim 13, wherein the chrominance scalar is generated according to a second piece-wise linear transformation of the quantization parameter.

17. The method of claim 16, wherein the second piece-wise linear transformation of the quantization parameter is as follows:

a) the chrominance scalar equals 8 whenever the quantization parameter falls within the values 1 through 4, inclusive;

(b) the chrominance scalar equals (the quantization parameter+13)/2 whenever the quantization parameter falls within the values 5 through 24, inclusive; and (c) the chrominance scalar equals the quantization parameter minus 6 whenever the quantization parameter falls within the values 25 through 31, inclusive.

18. A method comprising:

(1) receiving quantization data from a bitstream;

(2) determining a quantization parameter from the quantization data;

(3) generating a chrominance scalar according to a piece-wise linear transformation of the quantization parameter, wherein:

(i) the chrominance scalar equals 8 whenever the quantization parameter falls within the values 1 through 4, inclusive;

(ii) the chrominance scalar equals (the quantization parameter+13)/2 whenever the quantization parameter falls within the values 5 through 24, inclusive; and (iii) the chrominance scalar equals the quantization parameter minus 6 whenever the quantization parameter falls within the values 25 through 31, inclusive;

(4) inverse quantizing a DC coefficient of a chrominance block of up to two chrominance blocks by the chrominance scalar to yield an inverse quantized DC coefficient;

(5) transforming data of the up to two chrominance blocks, including the inverse quantized DC coefficient, according to an inverse discrete cosine transform; and (6) merging data of the up to two chrominance blocks to generate image data.

19. The method of claim 18, wherein the method further comprises:

generating a luminance scalar; and inverse quantizing a DC coefficient of a luminance block of up to two luminance blocks by the luminance scalar.

20. The method of claim 18, wherein the quantization data represents a change to a quantization parameter from a previously-decoded macroblock.

21. The method of claim 18, wherein if no quantization data is included in the bitstream for a particular macroblock, the method further comprises applying a previous quantization parameter associated with a previously-decoded macroblock as the quantization parameter.

22. The method of claim 18, wherein the luminance scalar is generated according to a second piece-wise linear transformation of the quantization parameter.

* * * * *

UNITED STATES PATENT AND TRADEMARK OFFICE
CERTIFICATE OF CORRECTION

PATENT NO. : 8,279,940 B2
APPLICATION NO. : 12/776106
DATED : October 2, 2012
INVENTOR(S) : Barin Geoffry Haskell, Atul Puri and Robert Lewis Schmidt It is certified that error appears in the above-identified patent and that said Letters Patent is hereby corrected as shown below:

Title page 2, Column 2, Item (56) OTHER PUBLICATIONS, line 7, delete "Standarization:" and insert -- Standardization: --, therefor.

Title page 2, Column 2, Item (56) OTHER PUBLICATIONS, line 10, delete "resuiting" and insert -- resulting: --, therefor.

In the Specifications

Column 3, line 28, after "steps" insert -- or functions --.

Column 4, TABLE 1, line 26, delete "$(Qp - 13)/2$" and insert -- $(Qp + 13)/2$ --, therefor.

Column 4, line 69, after "transform circuit 130 outputs macro" insert -- blocks of --.

Column 7, line 53, after "is known at the" delete "25".

In the Claims

Column 8, line 8, in claim 1, after "parameter" insert -- minus 16 --.

Column 8, line 18, in claim 2, after "wherein" insert -- the --.

Column 8, line 31-32, in claim 4, delete "comrising:" and insert -- comprising: --, therefor.

Column 9, line 6, in claim 7, after "yield" delete "a".

Column 9, line 52, in claim 12, after "parameter" insert -- minus 16 --.

Column 9, line 54, in claim 12, delete "quantizing,." and insert -- quantizing, --, therefor.

Column 10, line 15, in claim 17, delete "a)" and insert -- (a) --, therefor.

Signed and Sealed this
Twenty-fourth Day of December, 2013

Margaret A. Focarino
*Commissioner for Patents of the United States Patent and Trademark Office*